(12) United States Patent
Kim

(10) Patent No.: US 11,781,613 B2
(45) Date of Patent: Oct. 10, 2023

(54) BUSH-TYPE HYDRAULIC MOUNT

(71) Applicants: Hyundai Motor Company, Seoul (KR); Kia Corporation, Seoul (KR)

(72) Inventor: Seung Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/486,307

(22) Filed: Sep. 27, 2021

(65) Prior Publication Data
US 2022/0282765 A1 Sep. 8, 2022

(30) Foreign Application Priority Data
Mar. 5, 2021 (KR) .................. 10-2021-0029222

(51) Int. Cl.
*F16F 13/14* (2006.01)
*B60K 1/00* (2006.01)

(52) U.S. Cl.
CPC ............ *F16F 13/1445* (2013.01); *B60K 1/00* (2013.01); *F16F 13/1481* (2013.01); *F16F 2226/04* (2013.01)

(58) Field of Classification Search
CPC .... B60K 1/00; F16F 13/1481; F16F 13/1445; F16F 2226/04
See application file for complete search history.

(56) References Cited

U.S. PATENT DOCUMENTS

| 2007/0045918 A1* | 3/2007 | Thornhill | ............ F16F 13/1409 |
| | | | 267/140.12 |
| 2021/0062888 A1* | 3/2021 | Kondor | ............... F16F 13/1481 |

FOREIGN PATENT DOCUMENTS

| KR | 101738018 B1 | 5/2017 | |
| KR | 2019-0025401 A | 3/2019 | |
| WO | WO-2017038357 A1 * | 3/2017 | .............. F16F 13/14 |

* cited by examiner

*Primary Examiner* — Vishal R Sahni
(74) *Attorney, Agent, or Firm* — Fox Rothschild LLP

(57) ABSTRACT

A bush-type hydraulic mount used for mounting a motor module in an electric vehicle is provided. The bush-type hydraulic mount includes an inner pipe, a middle pipe disposed coaxially with the inner pipe, and a main rubber that is vulcanized between the inner pipe and the middle pipe. An outer pipe surrounds the middle pipe. The main rubber includes a front fluid chamber that is recessed from a surface of the main rubber, a rear fluid chamber adjacent to the front fluid chamber and recessed from the surface of the main rubber, and a bridge that separates the front fluid chamber and the rear fluid chamber to allow fluid to flow between the front fluid chamber and the rear fluid chamber and being deformable by external force.

10 Claims, 13 Drawing Sheets

BUSH-TYPE HYDRAULIC MOUNT

CROSS REFERENCE TO RELATED APPLICATION

The present application claims priority to Korean Patent Application No. 10-2021-0029222, filed on Mar. 5, 2021, the entire contents of which is incorporated herein for all purposes by this reference.

BACKGROUND

Field of the Disclosure

The present disclosure relates to an automotive mount and, more particularly, to a bush-type hydraulic mount used for mounting a motor module in an electric vehicle.

Description of the Related Art

Recently, research on an electric vehicle, which is an eco-friendly vehicle, has been actively conducted. An electric vehicle is driven by a motor instead of an engine used in the past and is supplied with power from a chargeable battery rather than petroleum fuel. Since low-frequency vibration that is generated in an electric vehicle is small, a motor is usually mounted in a center support type. Further, since a motor module including a motor and power electronics is lighter than the existing engines, a bush-type rubber mount is used instead of a hydraulic mount.

However, the axial characteristic of the bush-type rubber mount is very low due to the limit in the shape. Accordingly, there is a problem in that as the axial behavior increases residual vibration increases when passing through a plastic bump. One mount point, such as an axial torque rod, is added in some cases to solve this problem, but this is disadvantageous in terms of the package layout and assembly convenience and increases the manufacturing cost and weight.

SUMMARY

The present disclosure has been made in an effort to solve the problems described above and an objective of the present disclosure is to provide a bush-type hydraulic mount that can solve the problem of residual vibration in an electric vehicle by having an improved axial characteristic.

Another objective is to provide a bush-type hydraulic mount that can minimize an increase in manufacturing cost and weight. The objectives of the present disclosure are not limited to those described above and other objectives not stated herein would be apparent to those who have ordinary skills in the art that the present disclosure belongs to (hereafter, 'those skilled in the art') from the following description.

The features of the present disclosure for achieving the objectives of the present disclosure and performing the characteristic functions of the present disclosure to be described below are as follows.

A bush-type hydraulic mount according to the present disclosure may include: an inner pipe; a middle pipe disposed coaxially with the inner pipe; a main rubber vulcanized between the inner pipe and the middle pipe; and an outer pipe surrounding the middle pipe, wherein the main rubber includes: a front fluid chamber recessed from a surface of the main rubber; a rear fluid chamber being adjacent to the front fluid chamber and recessed from the surface of the main rubber; and a bridge separating the front fluid chamber and the rear fluid chamber such that fluid can flow between the front fluid chamber and the rear fluid chamber and being deformable by external force.

A method of assembling a bush-type hydraulic mount according to the present disclosure may include: disposing a middle pipe having an opening axially with an inner pipe that is disposed radially inside; vulcanizing a main rubber between the inner pipe and the middle pipe—the main rubber having a front fluid chamber recessed from a surface of the main rubber, a rear fluid chamber being adjacent to the front fluid chamber and recessed from the surface of the main rubber, and a bridge formed between the front fluid chamber and the rear fluid chamber, protruding radially outward further than the middle pipe, and being deformable by external force, wherein a first side that is a side of the bridge being longer than a second side that is an opposite side of the first side; and fitting an outer pipe from the second side to surround an outer side of the middle pipe.

According to the present disclosure, there is provided a bush-type hydraulic mount that can solve the problem of residual vibration in an electric vehicle by having an improved axial characteristic. Further, according to the present disclosure, there is provided a bush-type hydraulic mount that may minimize an increase in manufacturing cost and weight.

Effects of the present disclosure are not limited to those described above and other effects can be clearly recognized by those skilled in the art from the following description.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Figure 1A:
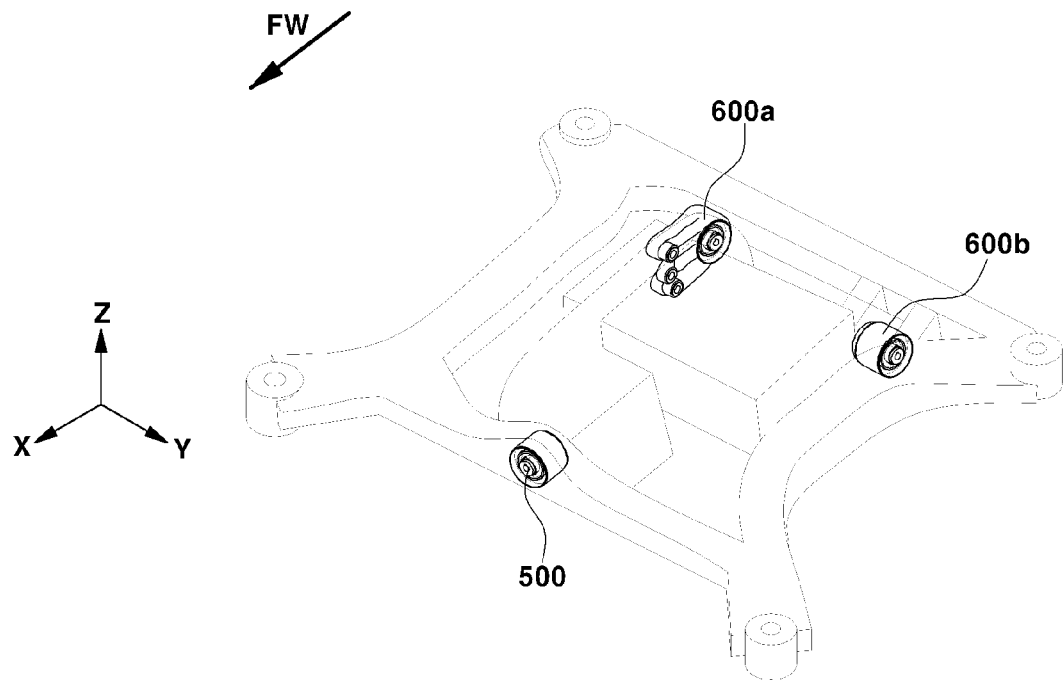
FIG. 1A shows a motor module mounting system of an electric vehicle.

Hereinafter, exemplary embodiments of the present disclosure will be described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The present disclosure will be described hereafter in detail with reference to the accompanying drawings.

Referring to FIG. 1A, a motor module has been mounted by a bush-type rubber mount 500 disposed in the front-rear direction and left and right mounts 600a and 600b in an electric vehicle. 'FW' indicates the front direction of a vehicle in FIG. 1A.

Figure 1B:
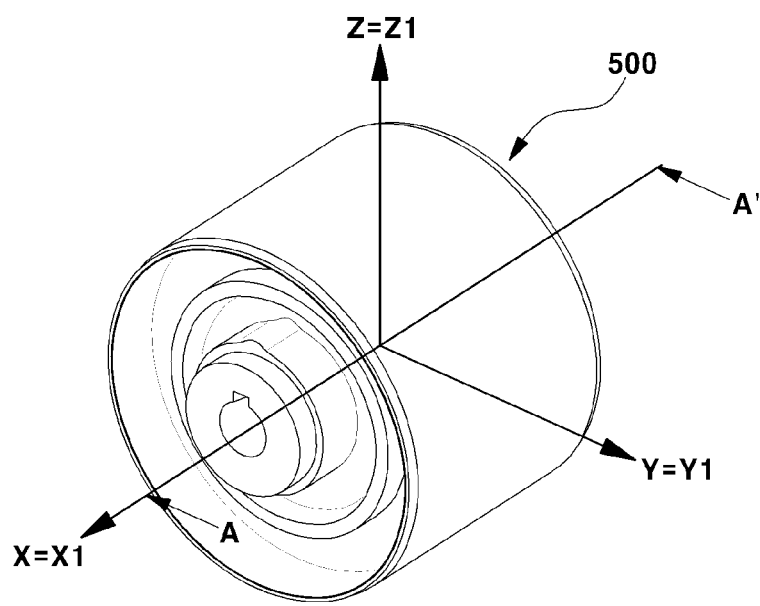
FIG. 1B shows a bush-type rubber mount of the related art.

The axial characteristic of a bush-type rubber mount is lower than lateral or vertical characteristic in the platform of an electric vehicle. For example, referring to FIG. 1B, it was found that the characteristic X1 in the X-direction of the bush-type rubber mount that is the axial direction of the bush-type rubber mount is 20 kgf/mm, the characteristic Y1 in the Y-direction that is the lateral direction is 65 kgf/mm, and the characteristic Z1 in the Z-direction that is the vertical direction is 65 kgf/mm.

Accordingly, the axial direction of the mount 500 positioned at the front is aligned in the X-direction that is the front-rear direction to increase the lateral characteristic. In this case, since the axial characteristic of the mount 500 is low, residual vibration is large. In particular, it is required to increase the axial characteristic, but it is impossible to increase the axial characteristic due to characteristics resulted from the shape of the bush-type rubber mount.

The present disclosure provides a bush-type hydraulic mount 1 capable of solving this problem. The bush-type hydraulic mount 1 according to the present disclosure is a bush-type engine mount designed particularly for an electric vehicle, having axial damping, and having fluid sealed therein. A bush-type mount has high vertical and lateral characteristics, but there is a limitation in increasing the axial characteristic. The present disclosure proposes a bush-type hydraulic mount that has axial damping to minimize an axial behavior to solve the problem.

Figure 2:
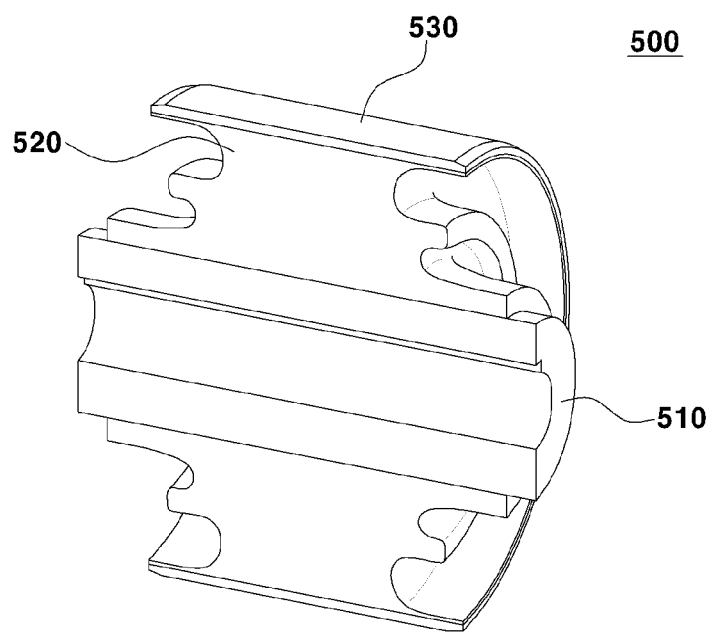
FIG. 2 is a cross-sectional view taken along line A-A' of FIG. 1B.

FIG. 2 is a cross-sectional view of a bush-type rubber mount 500 according to the related art. The bush-type rubber mount 500 is formed by vulcanizing rubber 520 between an inner pipe 510 and an outer pipe 530 that are coaxially arranged. The present disclosure provides a bush-type hydraulic mount 1 having an improved axial characteristic by adding a small number of parts compared to the bush-type rubber mount 500.

Figure 3A:
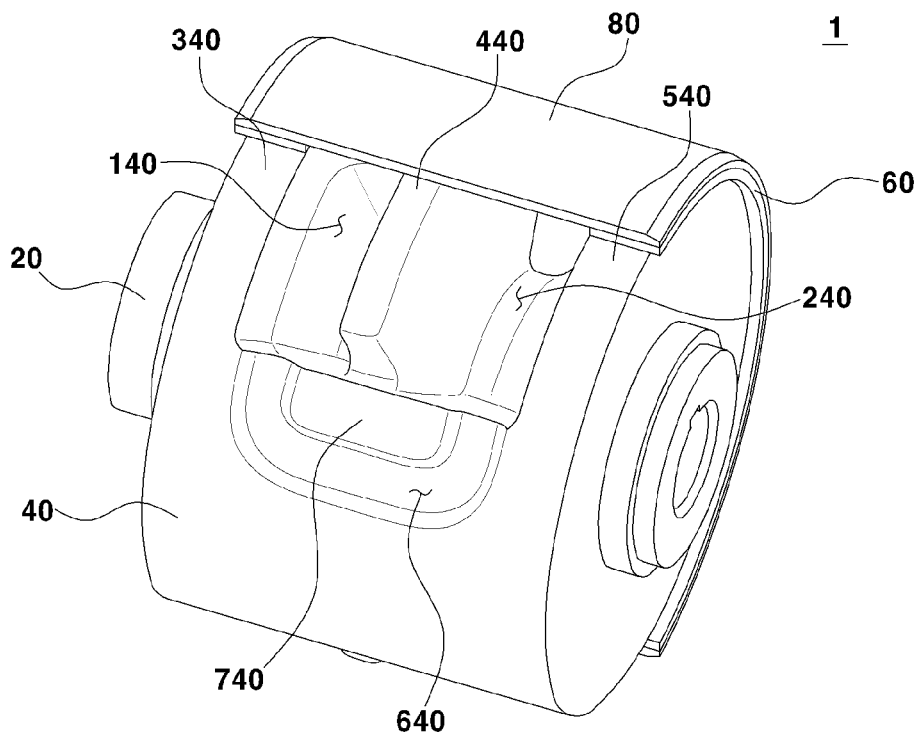
FIG. 3A is a perspective view showing a side of a bush-type hydraulic mount according to the present disclosure.

As shown in FIG. 3A, the bush-type hydraulic mount 1 according to the present disclosure may include an inner pipe 20, a main rubber 40, a middle pipe 60, and an outer pipe 80. The inner pipe 20, the middle pipe 60, and the outer pipe 80 are coaxially arranged, and the main rubber 40 is vulcanized between the inner pipe 20 and the middle pipe 60.

According to the present disclosure, the bush-type hydraulic mount 1 vertically has two sets of fluid chambers and channels, thereby maximizing a damping value. Accordingly, according to an embodiment of the present disclosure, the main rubber 40 may include a front fluid chamber 140, a rear fluid chamber 240, a first fixed portion 340, a bridge 440, a second fixed portion 540, a channel 640, and a guide 740. That is, the front fluid chamber 140, the rear fluid chamber 240, the first fixed portion 340, the bridge 440, the second fixed portion 540, the channel 640, and the guide 740 each may be symmetrically formed up and down with respect to the axial direction of the bush-type hydraulic mount 1 therebetween.

The front fluid chamber 140 and the rear fluid chamber 240 are separated by the bridge 440, and fluid may flow therebetween. The front fluid chamber 140 is disposed between the first fixed portion 340 and the bridge 440 in the axial direction of the bush-type hydraulic mount 1. The rear fluid chamber 240 is disposed between the bridge 440 and the second fixed portion 540 in the axial direction of the bush-type hydraulic mount 1. The first fixed portion 340 and the second fixed portion 540 are fixed to the middle pipe 60. The bridge 440, as will be described below, can move with respect to the middle pipe 60.

The front fluid chamber 140 and the rear fluid chamber 240 keep fluid therein and are recessed inward in the radial direction of the bush-type hydraulic mount 1 from the surface of the main rubber 40.

The bridge 440 is disposed between the front fluid chamber 140 and the rear fluid chamber 240. The bridge 440 is integrally formed with the main rubber 40 and may be deformed by external force. According to an embodiment of the present disclosure, the bridge 440 has a front portion 442, a contact portion 444, and a rear portion 446 (see FIG. 4A).

The front portion 442 is in direct contact with the front fluid chamber 140. The rear portion 446 is in direct contact with the rear fluid chamber 240. The contact portion 444 is in contact with the outer pipe 80, and the contact position and area on the outer pipe 80 may be changed by external force.

The bridge 440 gradually decreases in thickness outward in the radial direction of the bush-type hydraulic mount 1. The bridge 440 is tapered to be biased in one direction and thus, the thickness gradually decreases radially outward. Accordingly, according to an embodiment of the present disclosure, the front portion 442 is shorter than the rear portion 446. Due to this shape, the bridge 440 may deform or bend in only one direction, whereby durability and assembly convenience may be improved and noise can be decreased.

Figure 5:
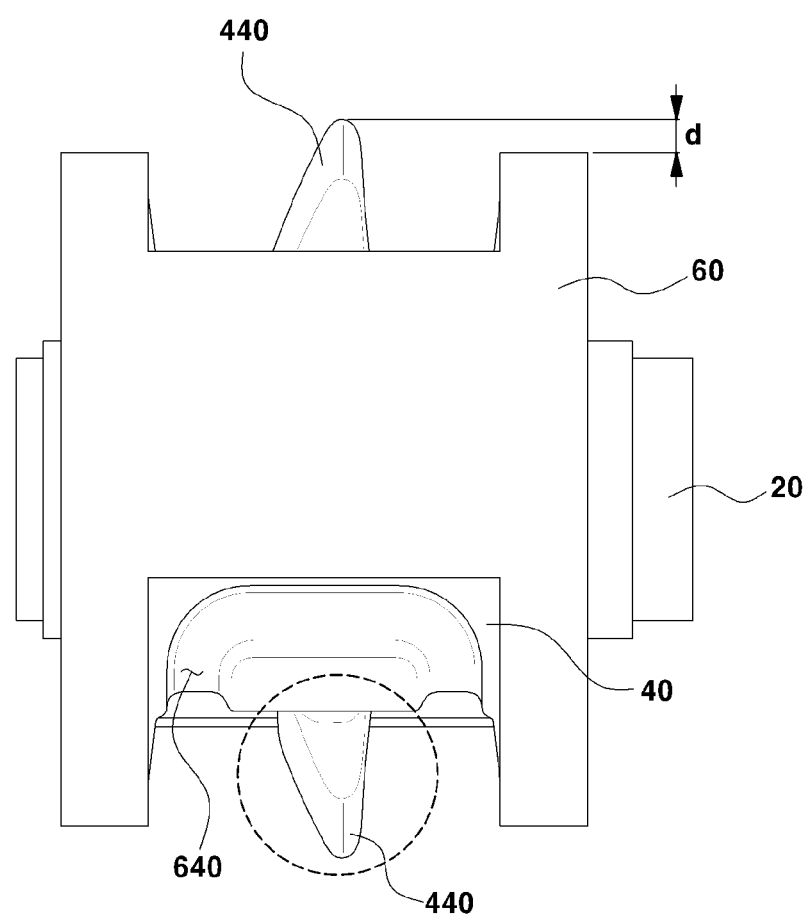
FIG. 5 is a side view of the bush-type hydraulic mount according to the present disclosure with an outer pipe removed.
Figure 6A:
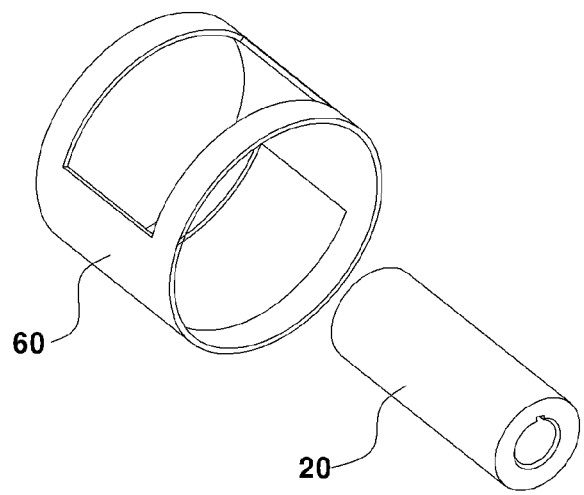
FIGS. 6A to 6H show an assembly process of the bush-type hydraulic mount according to the present disclosure.
Figure 6B:
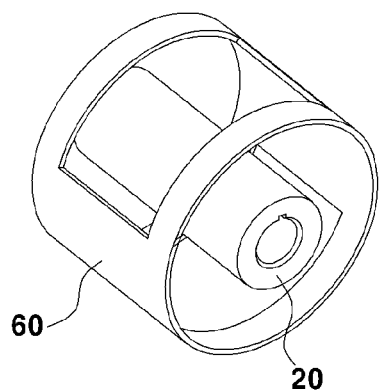
Figure 6C:
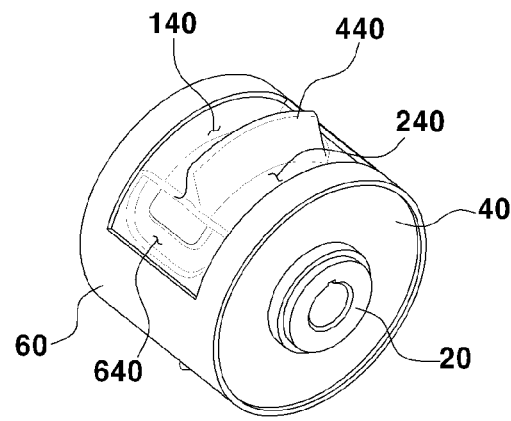
Figure 6D:
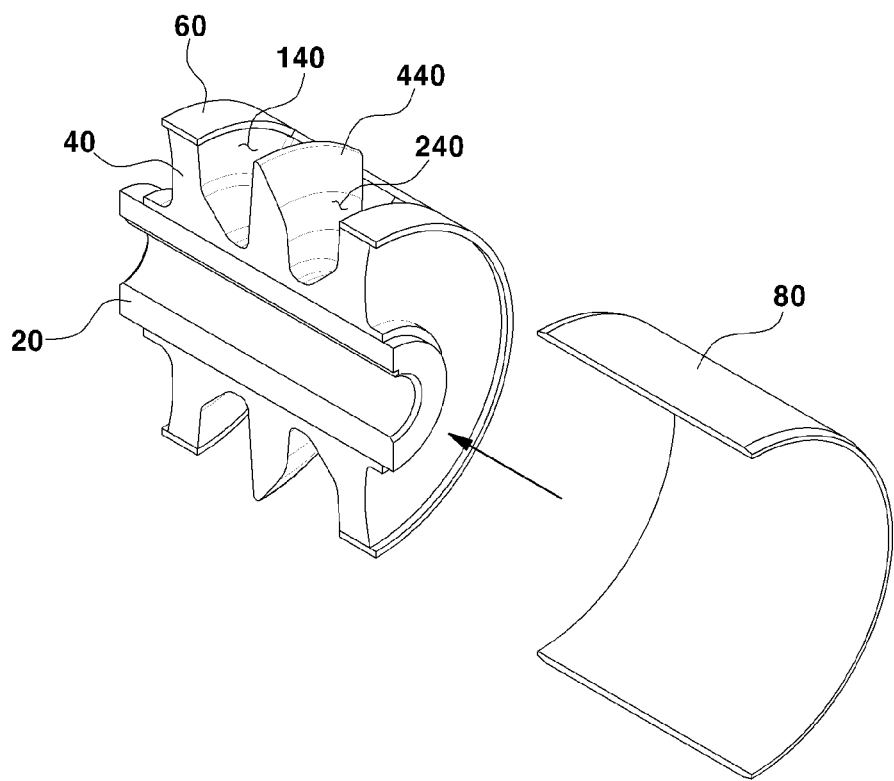
Figure 6E:
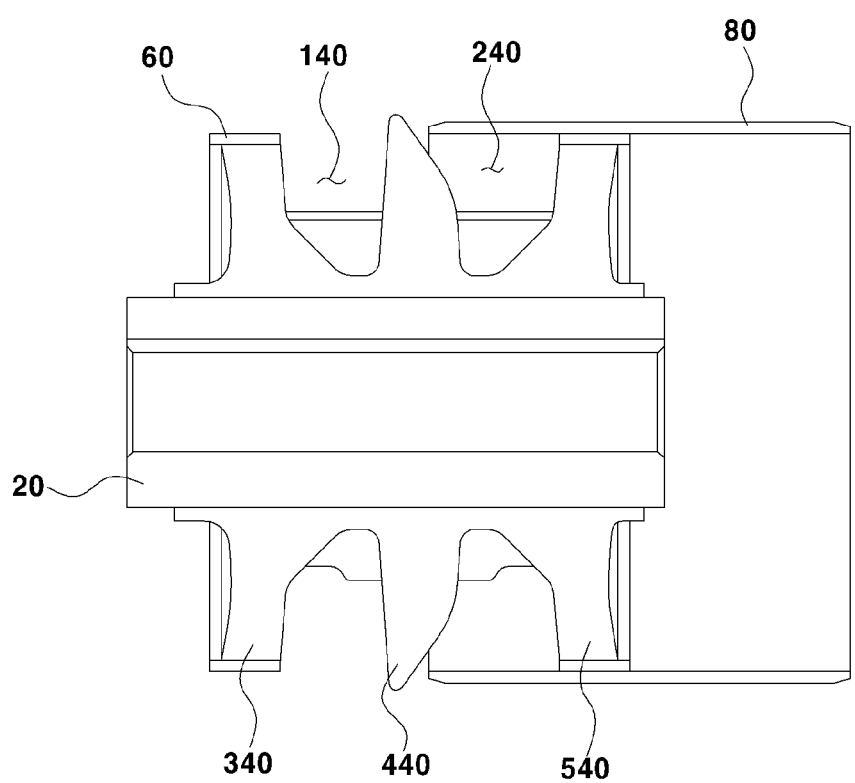
Figure 6F:
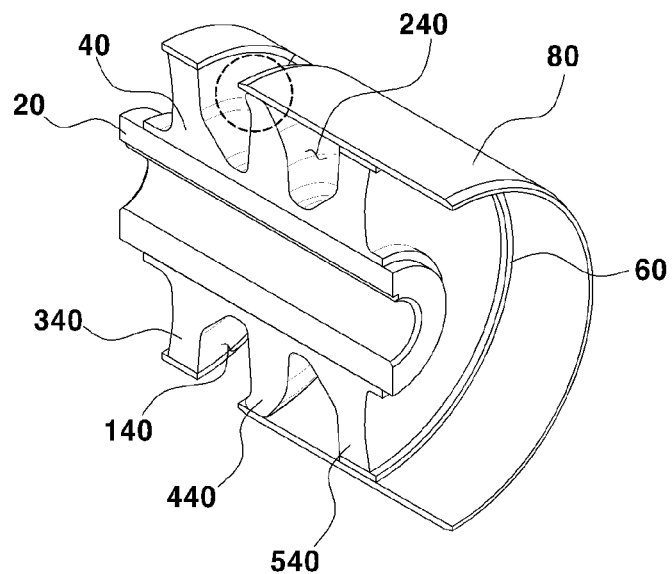
Figure 6G:
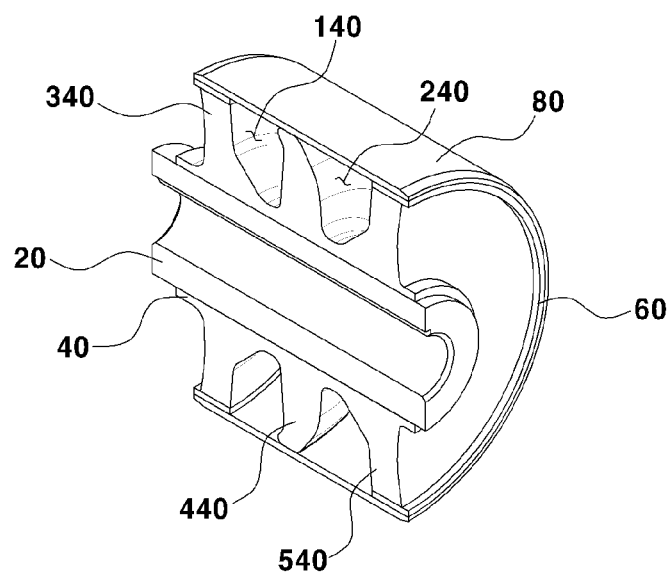
Figure 6H:
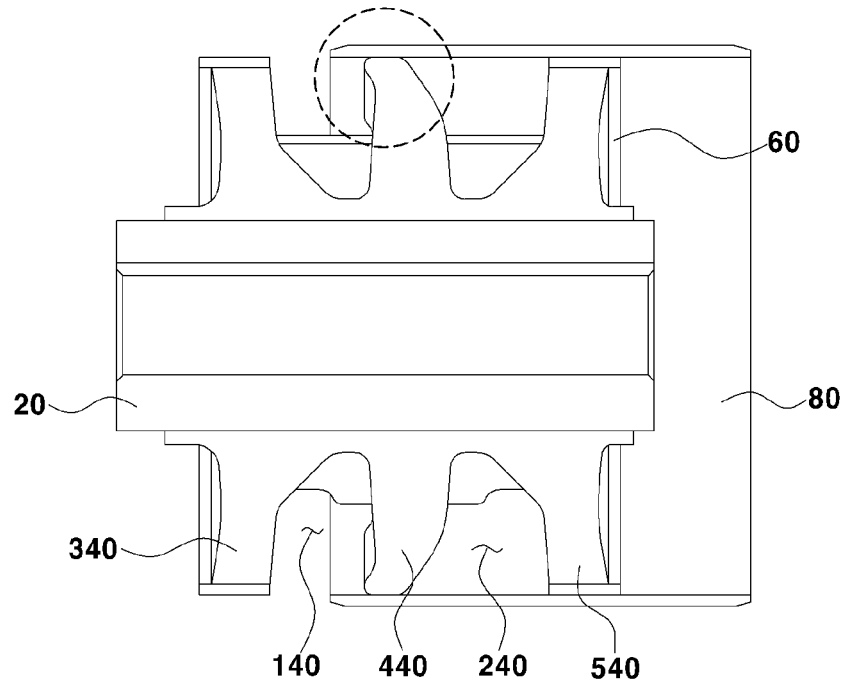

As shown in FIG. 5, the bridge 440 extends radially outward further than the first fixed portion 340 and the second fixed portion 540. Accordingly, the bridge 440 protrudes radially outward by a length d further than the middle pipe 60. According to an embodiment of the present disclosure, the bridge 440 protrudes radially outward by about 3 to 5 mm further than the middle pipe 60.

The front fluid chamber 140 and the rear fluid chamber 240 connected by the channel 640 and thus, fluid may flow therebetween. The fluid in the front fluid chamber 140 and the fluid in the rear fluid chamber 240 may move to the counter-fluid chambers through the channel 640 when the front fluid chamber 140 or the rear fluid chamber 240 are expanded or contracted by external force.

The channel 640 is recessed from the surface of the main rubber 40 similar to the front fluid chamber 140 and the rear fluid chamber 240. According to an embodiment of the present disclosure, the recessed depth of the channel 640 is less than those of the front fluid chamber 140 and the rear fluid chamber 240.

The cross-sectional area of the channel 640 may be increased and decreased by the guide 740. The sizes of the inlets of the front fluid chamber 140 and the rear fluid chamber 240 may be adjusted by adjusting the size of the guide 740. The guide 740 may be provided by forming the channel 640 connecting the front fluid chamber 140 and the rear fluid chamber 240 to each other. In other words, guide 740 has the same height as the surfaces of the first fixed portion 340 and the second fixed portion 540 or the main rubber 40, but is taller than the channel 640. According to the present disclosure, the length and/or area of the channel 640 formed in the main rubber 40 may be adjusted, so a damping frequency, etc. may be tuned.

Figure 3B:
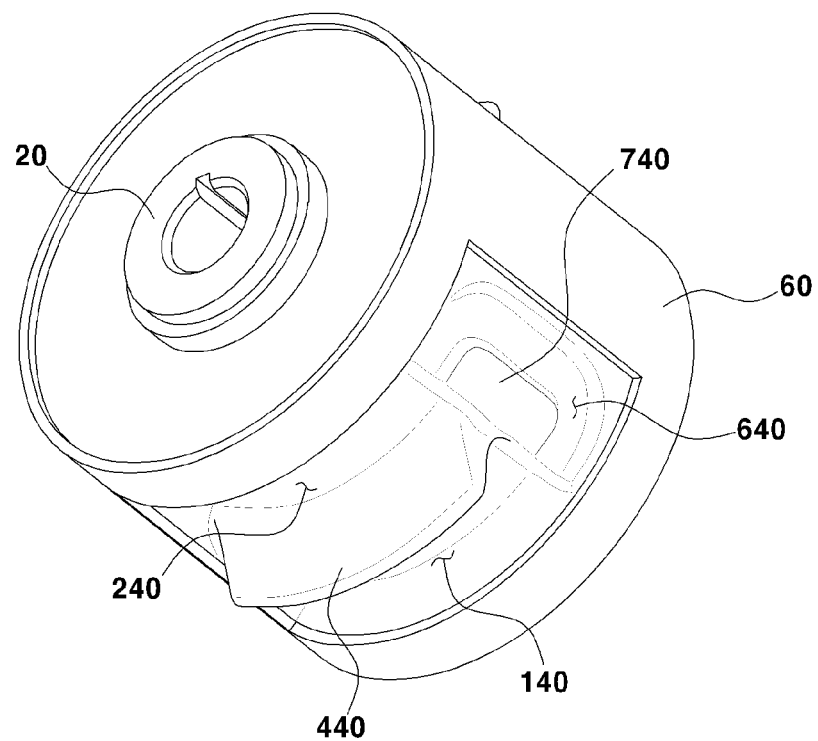
FIG. 3B is a perspective view showing another side of a bush-type hydraulic mount of FIG. 3A seen from the bottom.

Referring to FIG. 3B, according to an embodiment of the present disclosure, the channel 640 may be formed to be axially symmetric with respect to the center point of the axis of the bush-type hydraulic mount 1. In other words, when the channel 640 is formed at the upper portion and the lower portion of one bush-type hydraulic mount 1, the channel 640 at the upper portion and the channel 640 at the lower portion are positioned to be symmetric with respect to the axial direction with the axis of the bush-type hydraulic mount 1 therebetween.

The guide 740 at the upper portion and the guide 740 at the lower portion respectively adjacent to the channel 640 at the upper portion and the channel 640 at the lower portion are also disposed to be axially symmetric with respect to the axis of bush-type hydraulic mount 1. Accordingly, double damping is provided to the vertical behavior of the bush-type hydraulic mount 1, so damping may be maximized.

Figure 4A:
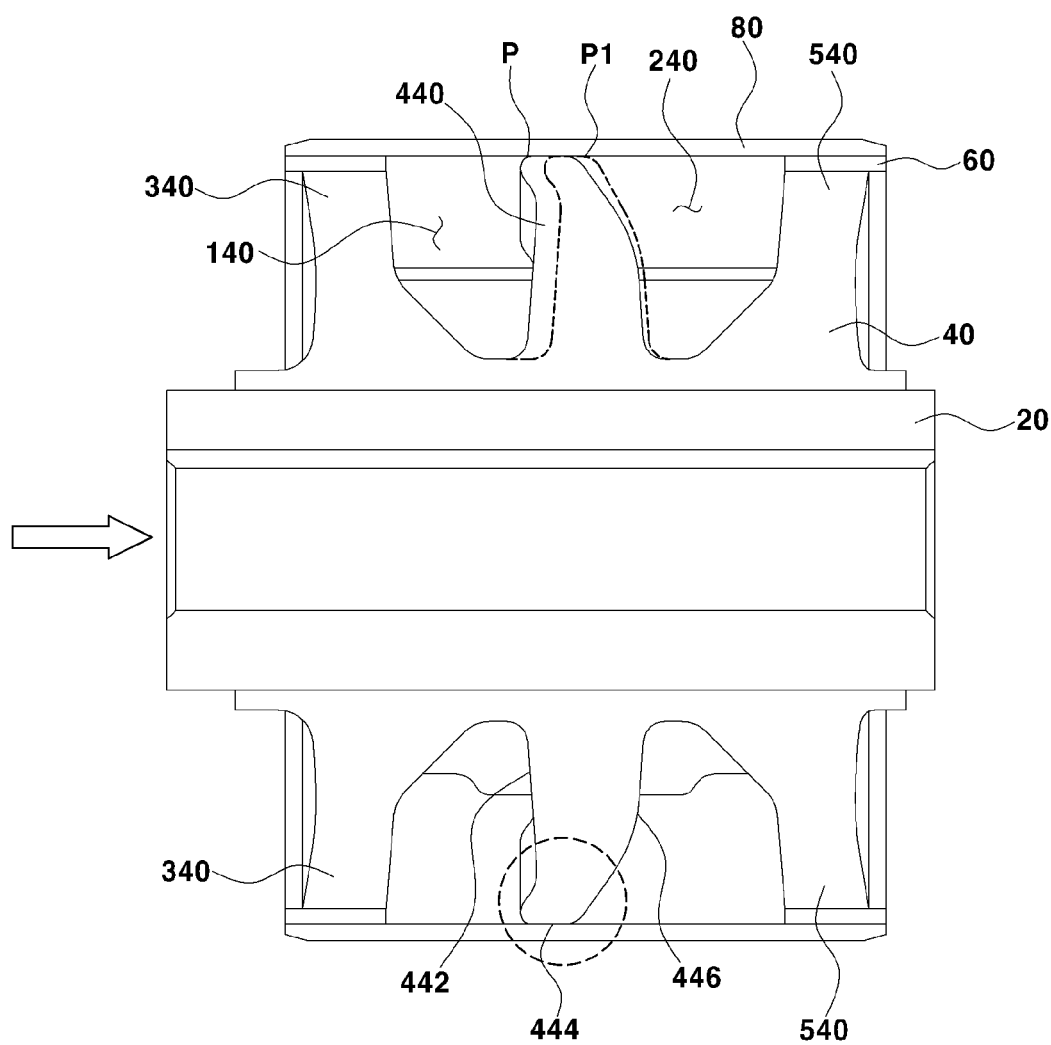
FIG. 4A is a cross-sectional view of the bush-type hydraulic mount according to the present disclosure.

The operation of the bush-type hydraulic mount 1 according to the present disclosure when axial force is applied to the bush-type hydraulic mount 1 therebetween in the direction of an arrow shown in FIG. 4A is described.

The bridge 440 is at the position P before force is applied in the direction of the arrow. When an axial force is applied in the direction of the arrow, the bridge 440 slides rearward on the outer pipe 80 to the position P1 with the first fixed portion 340 and the second fixed portion 540 fixed at their positions. The fluids in the front fluid chamber 140 and the rear fluid chamber 240 are oily substances with a low friction coefficient, so the bridge 440 slides. The fluid in the front fluid chamber 140 increases in volume and the fluid in the rear fluid chamber 240 decreases in volume.

The front portion 442 of the bridge 440 is longer than the rear portion 446, and when the outer pipe 80 is fitted, as will be described below, the end of the rear portion 446 becomes the contact portion 444. Accordingly, the bridge 400 may bend in only one direction and is not shaken left and right when the bush-type hydraulic mount 1 is axially moved. Accordingly, durability may be improved and noise that may be generated when the direction of the bridge 440 is changed may be prevented.

Figure 4B:
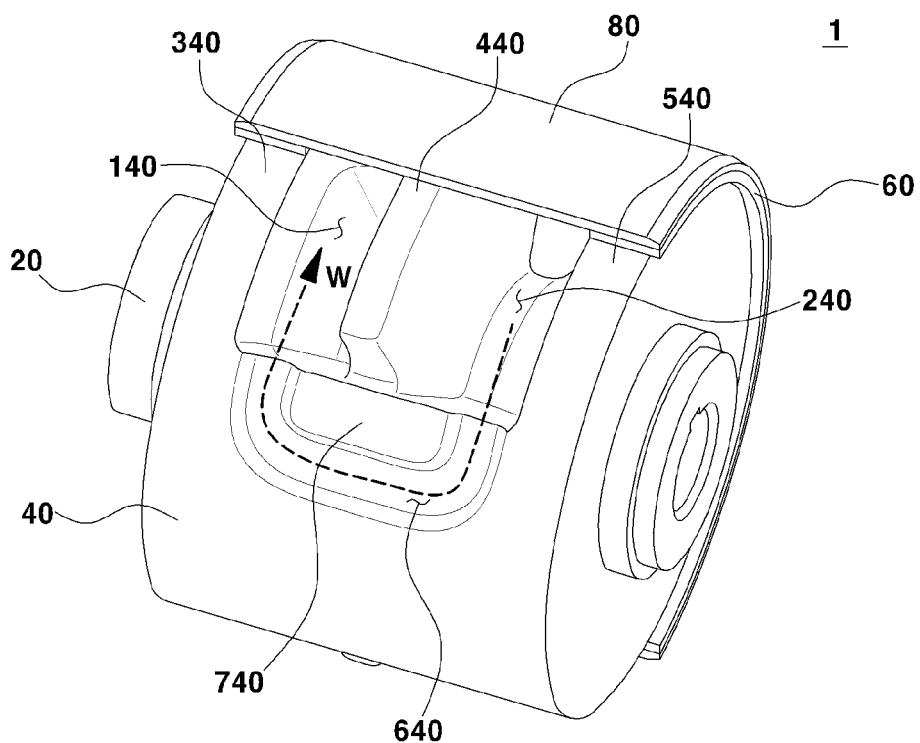
FIG. 4B shows the bush-type hydraulic mount according to the present disclosure.

As shown in FIG. 4B, when the rear fluid chamber 240 is contracted, the fluid in the rear fluid chamber 240 flows toward the front fluid chamber 140 through the channel 640, as indicated by 'W', thereby providing damping. In particular, since two front fluid chambers 140 and two rear fluid chambers 240 are each provided at the upper portion and the lower portion of the bush-type hydraulic mount 1 to be symmetric with the axial direction therebetween, double damping is provided to the vertical behavior, whereby damping can be maximized.

An assembly process of the bush-type hydraulic mount 1 according to the present disclosure is described with reference to FIGS. 6A to 6H.

The inner pipe 20 is inserted into the middle pipe 60 and then the main rubber 40 is vulcanized. Accordingly, the front fluid chamber 140, the rear fluid chamber 240, and the bridge 440 are positioned in the opening of the middle pipe 60.

The outer pipe 80 is assembled in a fluid, and in this process, the bush-type hydraulic mount 1 is filled with the fluid. The outer pipe 80 is fitted from the longer rear portion 446. As the outer pipe 80 is axially slid, the bridge 440 is compressed, and thus, the front fluid chamber 140 and the rear fluid chamber 240 may be separated. When the outer pipe 80 is fitted, the outer pipe 80 presses the bridge 440 protruding radially outward further than the middle pipe 60 and the end of the bridge 440 bends forward. Further, the longer rear portion 446 bends forward, a portion of the end of the rear portion 446 becomes the contact portion 444. After fitting the outer pipe 80, swaging for sealing is performed on the first fixed portion 340 and the second fixed portion 540.

Figure 7A:
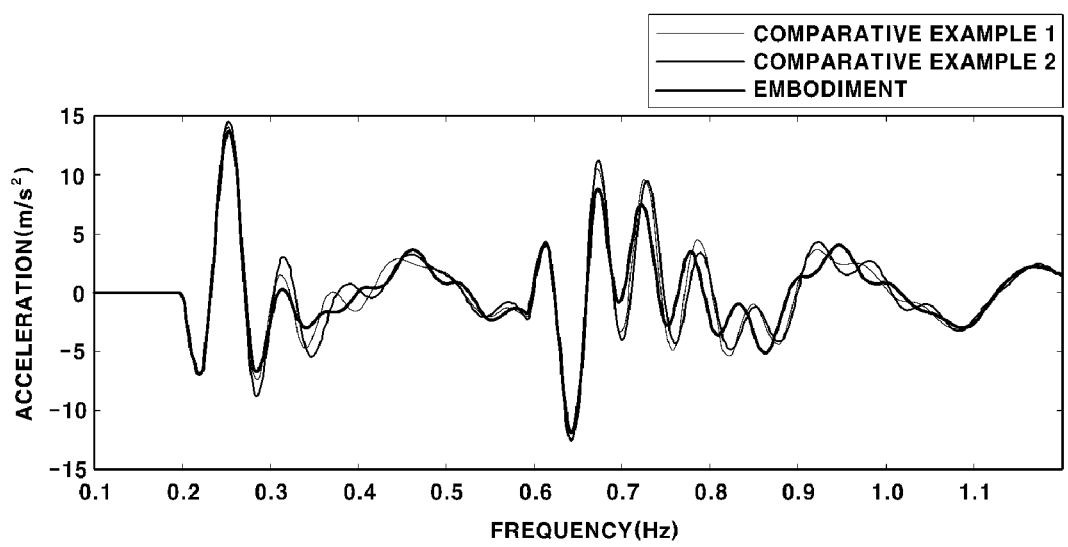
FIGS. 7A and 7B compare the behavior characteristics of an embodiment of the present disclosure and comparative examples.
Figure 7B:
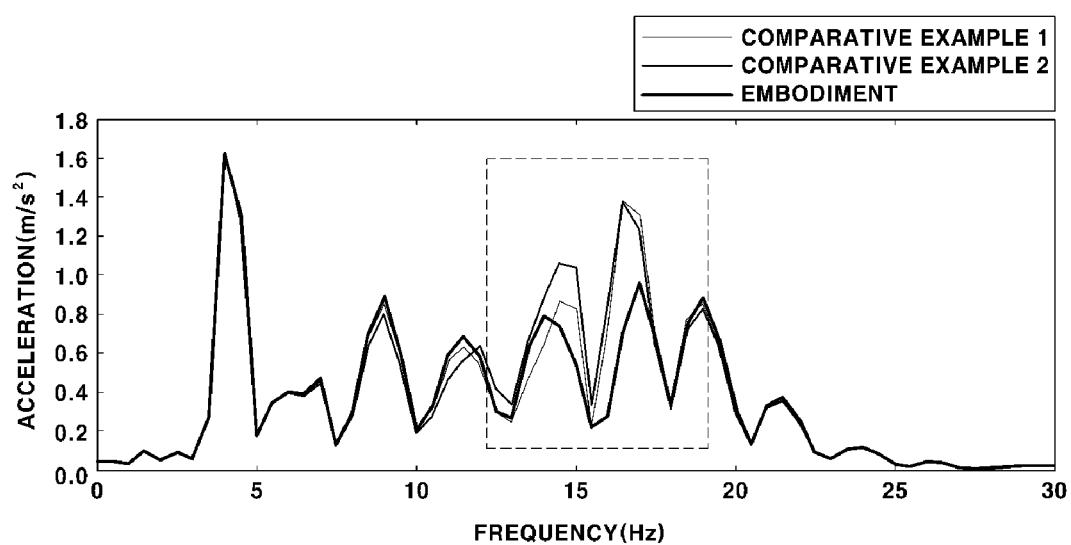

FIGS. 7A and 7B compare the front-rear characteristics of an embodiment of the present disclosure (legend E) and comparative examples. An existing bush-type rubber mount having a front-rear characteristic of 20 kgf/mm was used in the comparative example 1 (legend C1) and a bush-type rubber mount having a higher front-rear characteristic of 27 kgf/mm was used in the comparative example 2 (legend C2). The rubber characteristic was increased up to hardness HS70 for a principle evaluation in the comparative example 2, but as shown in the figures, it can be seen that there is no improvement or it was worse at some portions.

HS70 indicates the hardness of rubber to be vulcanized, and the higher the number, the higher the characteristic of the rubber. Rubber having HS 35 to HS 65 are usually applied to mounts, but HS70 was applied for a principle test. It was found that residual vibration was decreased when front-rear damping was applied in the embodiment of the present disclosure. In particular, it was found that the characteristic was improved up to the frequency range of 13 to 18 Hz.

The axial characteristic could not be increased in the existing bush-type rubber mounts, so residual vibration was large due to an excessive front-rear behavior of a motor module in an electric vehicle. According to the present disclosure, residual vibration can be decreased by adding axial damping values.

Further, since only minimum parts are added in the present disclosure, as compared with general bush-type mounts, the manufacturing cost and an increase in weight can be minimized. As compared with a bush-type rubber mount, the middle mount 60 and the sealed fluid are included, but, in particular, the channel 640 is formed on the main rubber 40 by vulcanization, and thus, the manufacturing cost and an increase in weight may be minimized.

The present disclosure may provide damping performance using fluid chambers according to the front-rear behavior through a design of compressing a bridge. This configuration may be achieved by vulcanizing the main rubber, preventing an increase in manufacturing cost or weight.

According to the present disclosure, the bridge 440 is tapered to be biased to a side and is bent to only one side, so the shape thereof can be maintained even under an axial behavior, whereby durability and assembly convenience can be improved and noise can be decreased.

According to the present disclosure, since fluid chamber are vertically symmetric, 3-directional characteristics are separated, whereby a motor mounting system can be optimized.

It will be apparent to those skilled in the art that the foregoing present disclosure is not limited by the foregoing embodiments and the accompanying drawings, and various modifications and changes may be made without departing from the scope and spirit of the present disclosure.

What is claimed is:

1. A bush-type hydraulic mount, comprising:
an inner pipe;
a middle pipe disposed coaxially with the inner pipe;
a main rubber vulcanized between the inner pipe and the middle pipe; and
an outer pipe surrounding the middle pipe,
wherein the main rubber includes, at a first side of the mount:
a first front fluid chamber recessed from a surface of the main rubber;
a first rear fluid chamber being adjacent to the first front fluid chamber and recessed from the surface of the main rubber;
a first bridge separating the first front fluid chamber and the first rear fluid chamber allowing fluid to flow between the front fluid chamber and the rear fluid chamber and being deformable by an external force;
a first channel recessed from the surface of the main rubber and connecting the first front fluid chamber and the first rear fluid chamber to each other;
wherein the main rubber includes, at a second side of the mount:
a second front fluid chamber recessed from the surface of the main rubber;
a second rear fluid chamber being adjacent to the second front fluid chamber and recessed from the surface of the main rubber;
a second bridge separating the second front fluid chamber and the second rear fluid chamber allowing fluid to flow between the second front fluid chamber and the second rear fluid chamber and being deformable by external force; and
a second channel recessed from the surface of the main rubber and connecting the second front fluid chamber and the second rear fluid chamber to each other;
wherein the second front fluid chamber, the second rear fluid chamber, the second bridge, and the second channel are separably and symmetrically disposed up and down from the first front fluid chamber, the first rear fluid chamber, the first bridge, and the first channel with respect to an axial direction of the middle pipe;
wherein each of the first bridge and the second bridge extends from the main rubber as a single body, respectively, and each of the first bridge and the second bridge has a front portion being in contact with the respective front fluid chamber and a rear portion extending from the front portion and being in contact with the respective rear fluid chamber, wherein the rear portion is longer than the front portion and an end of the rear portion forms a contact portion being in contact with the outer pipe and being movable with respect to the outer pipe by external force;
and
wherein, when the external force is applied, each bridge is configured to slide on the outer pipe such that a volume of the respective front fluid chamber and a volume of the respective rear fluid chamber changes.

2. The bush-type hydraulic mount of claim 1, wherein the bridge is elongated radially outward further than the middle pipe.

3. The bush-type hydraulic mount of claim 1, wherein each of the first and second bridges comes in contact with the outer pipe while bending in a fitting direction of the outer pipe when the outer pipe is fitted.

4. The bush-type hydraulic mount of claim 1, wherein each of the first and second bridges is tapered to be biased to a side and a thickness thereof decreases outward in a radial direction of the main rubber.

5. The bush-type hydraulic mount of claim 1, wherein the bridge bends only to a side with respect to an axial direction of the bush-type hydraulic mount.

6. The bush-type hydraulic mount of claim 1, wherein the main rubber includes:
a first guide formed by the first front fluid chamber, the first rear fluid chamber, the first bridge, and the first channel and being adjacent to the first front fluid chamber, the first rear fluid chamber, the first bridge, and the first channel; and a second guide formed by the second front fluid chamber, the second rear fluid chamber, the second bridge, and the second channel and being adjacent to the second front fluid chamber, the second rear fluid chamber, the second bridge, and the second channel.

7. The bush-type hydraulic mount of claim 6, wherein the channel and the guide are disposed to be axially symmetric with respect to an axis of the middle pipe.

8. The bush-type hydraulic mount of claim 1, wherein, when an axial force is applied, the first and second rear fluid chambers decreases in volume.

9. A method of assembling a bush-type hydraulic mount, comprising:
   disposing a middle pipe having an opening axially with an inner pipe that is disposed radially inside;
   vulcanizing a main rubber between the inner pipe and the middle pipe; and
   fitting an outer pipe from a second side to surround an outer side of the middle pipe;
   wherein the main rubber includes, at a first side of the mount:
      a first front fluid chamber recessed from a surface of the main rubber;
      a first rear fluid chamber being adjacent to the first front fluid chamber and recessed from the surface of the main rubber;
      a first bridge separating the first front fluid chamber and the first rear fluid chamber allowing fluid to flow between the front fluid chamber and the rear fluid chamber and being deformable by an external force;
      a first channel recessed from the surface of the main rubber and connecting the first front fluid chamber and the first rear fluid chamber to each other;
   wherein the main rubber includes, at a second side of the mount:
      a second front fluid chamber recessed from the surface of the main rubber;
      a second rear fluid chamber being adjacent to the second front fluid chamber and recessed from the surface of the main rubber;
      a second bridge separating the second front fluid chamber and the second rear fluid chamber allowing fluid to flow between the second front fluid chamber and the second rear fluid chamber and being deformable by external force; and
      a second channel recessed from the surface of the main rubber and connecting the second front fluid chamber and the second rear fluid chamber to each other;
   wherein the second front fluid chamber, the second rear fluid chamber, the second bridge, and the second channel are separably and symmetrically disposed up and down from the first front fluid chamber, the first rear fluid chamber, the first bridge, and the first channel with respect to an axial direction of the middle pipe;
   wherein the first side that is a side of each of the first and second bridges is longer than the second side that is an opposite side of the first side;
   wherein each of the first bridge and the second bridge extends from the main rubber as a single body, respectively, and each of the first bridge and the second bridge has a front portion being in contact with the respective front fluid chamber and a rear portion extending from the front portion and being in contact with the respective rear fluid chamber, wherein the rear portion is longer than the front portion and an end of the rear portion forms a contact portion being in contract with the outer pipe and being movable with respect to the outer pipe by external force;
   and
   wherein, when the external force is applied, each of the first and second bridges is configured to slide on the outer pipe such that a volume of the respective front fluid chamber and a volume of the respective rear fluid chamber changes.

10. The method of claim 9, further comprising:
    swaging both ends of the outer pipe.

* * * * *